(12) United States Patent
Saffre

(10) Patent No.: US 9,971,543 B2
(45) Date of Patent: May 15, 2018

(54) METHODS AND APPARATUS FOR STORING ELECTRONIC DOCUMENTS

(71) Applicant: BRITISH TELECOMMUNICATIONS PUBLIC LIMITED COMPANY, London (GB)

(72) Inventor: Fabrice Saffre, London (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 75 days.

(21) Appl. No.: 15/312,812

(22) PCT Filed: May 5, 2015

(86) PCT No.: PCT/GB2015/051311
§ 371 (c)(1),
(2) Date: Nov. 21, 2016

(87) PCT Pub. No.: WO2015/177505
PCT Pub. Date: Nov. 26, 2015

(65) Prior Publication Data
US 2017/0153818 A1   Jun. 1, 2017

(30) Foreign Application Priority Data

May 21, 2014 (EP) .................................... 14250076

(51) Int. Cl.
*G06F 3/00* (2006.01)
*G06F 3/06* (2006.01)

(52) U.S. Cl.
CPC .............. *G06F 3/065* (2013.01); *G06F 3/067* (2013.01); *G06F 3/0619* (2013.01); *G06F 3/0653* (2013.01)

(58) Field of Classification Search
None
See application file for complete search history.

(56) References Cited

U.S. PATENT DOCUMENTS 5,559,984 A   9/1996 Nakano et al.
6,256,675 B1  7/2001 Rabinovich
(Continued)

OTHER PUBLICATIONS

International Search Report for PCT/GB2015/051311 dated Jun. 5, 2015, 3 pages.
(Continued)

*Primary Examiner* — Daniel D Tsui
*Assistant Examiner* — Craig S Goldschmidt
(74) *Attorney, Agent, or Firm* — Nixon & Vanderhye PC

(57) ABSTRACT

Methods and apparatus (10) are disclosed for storing electronic documents in a distributed electronic storage system comprising a plurality of electronic storage devices (16) together providing a total storage capacity, the system having a target number of copies in respect of each document stored therein; the method comprising: determining the current number of copies of a requested document stored in the system and increasing the number of copies of that document unless the number of copies of that document is already at or above the target number of copies in respect of that document; and otherwise selecting at least one other document the number of copies stored in the system of which is below the target number of copies in respect of that at least one other document, and increasing the number of copies of that at least one other document instead.

11 Claims, 2 Drawing Sheets

(56) References Cited

U.S. PATENT DOCUMENTS 7,647,329 B1 * 1/2010 Fischman ......... G06F 17/30094
707/999.1
7,739,233 B1 6/2010 Ghemawat et al.

OTHER PUBLICATIONS

Written Opinion of the ISA for PCT/GB2015/051311 dated Jun. 5, 2015, 5 pages.
Bindel et al., "OceanStore: An Extremely Wide-Area Storage System", (Report No. UCB/CSD 00-1102 of the Computer Science Division (EECS), University of California (Berkeley), Mar. 1999, 17 pages.
Cohen et al., "Replication Strategies in Unstructured Peer-to-Peer Networks", *SIGCOMM*'02, Aug. 19-23, 2002, 14 pages.
Ghemawat et al., "The Google File System", *SOSP* '03, Oct. 19-22, 2003, 15 pages.
Wolfson et al., "An Adaptive Data Replication Algorithm", (*ACM Transactions on Database Systems*(*TODS*), vol. 22, issue 2, Jun. 1997, pp. 255-314.
Zhang et al., "Designing a Power-aware Replication Strategy for Storage Clusters", 2013 *IEEE Computer Society*, 2013, pp. 224-231.

* cited by examiner

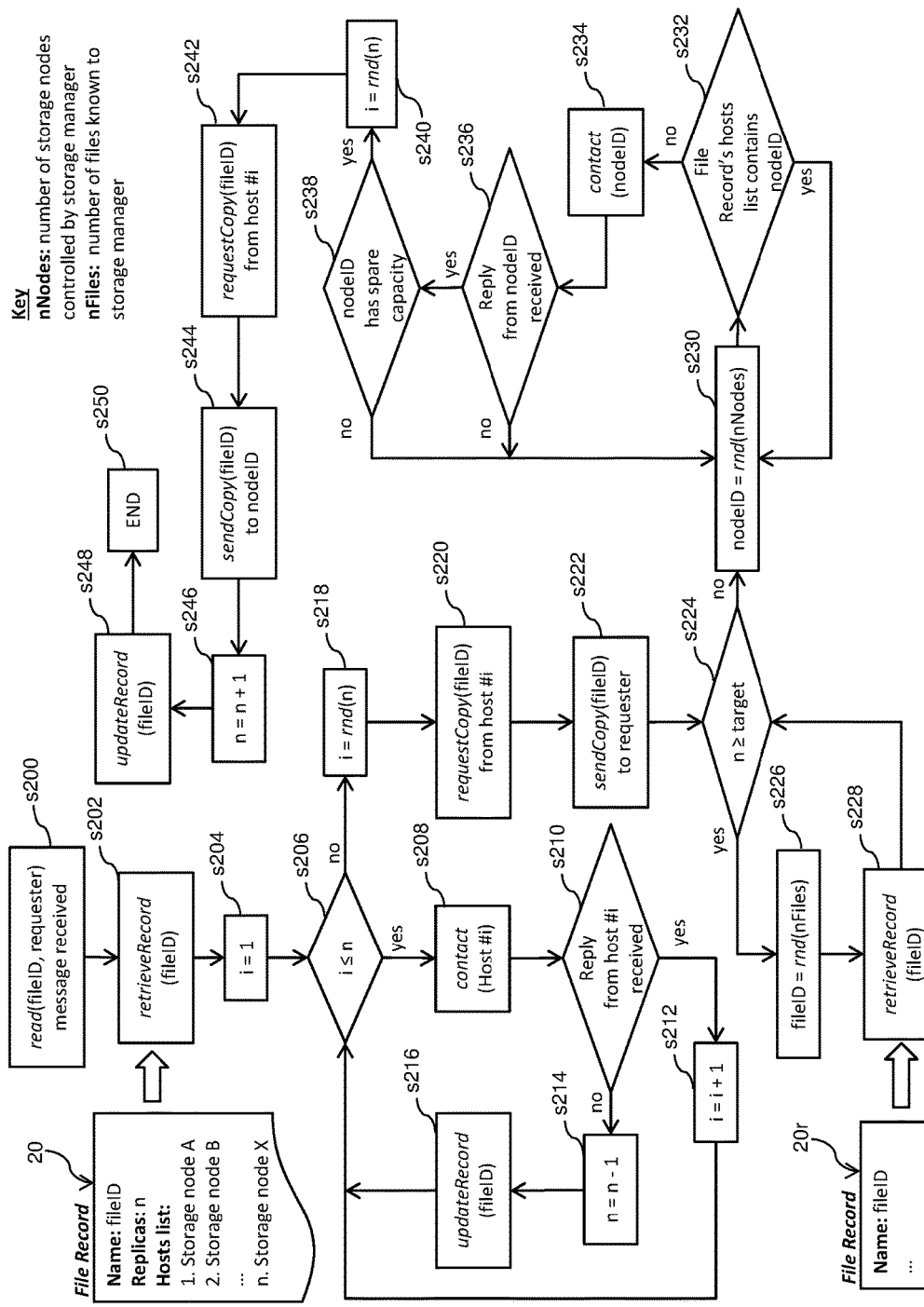
Figure 2: Storage manager's file access and replication loop

METHODS AND APPARATUS FOR STORING ELECTRONIC DOCUMENTS

This application is the U.S. national phase of International Application No. PCT/GB2015/051311 filed May 5, 2015 which designated the U.S. and claims priority to EP Priority Application No. 14250076.8 filed May 21, 2014, the entire contents of each of which are hereby incorporated by reference.

TECHNICAL FIELD

The present invention relates to methods and apparatus for storing electronic documents. In particular it relates to methods and apparatus for storing electronic documents in a distributed electronic storage system comprising electronic storage devices.

BACKGROUND TO THE INVENTION AND PRIOR ART

Generally, in the field of computing, the term "The Cloud" refers to the Internet. Similarly, the term "Cloud Computing" generally refers to distributed computing over a communication network such as the Internet, an intranet, a local area network (LAN) or wide area network (WAN).

The term "Cloud Storage" generally refers to the storing of data in the form of electronic documents on multiple servers or virtual servers, which may be hosted by third parties, in order that the data may be accessed by one or more users via the network in question.

Increasing amounts of data are stored (or backed-up) using Cloud Storage either as well as or instead of being stored (or backed-up) on personal hard-drives or other media. There are various "storage-as-a-service" products available, including Google's "Google Drive", Microsoft's "OneDrive" (previously referred to as "SkyDrive"), Amazon's "Cloud Drive" and Apple's "iCloud".

In this context, protecting data against failure of storage devices (a statistically rare event that becomes a fact of life when dealing with the thousands of hard drives that may make up a cloud storage facility) is a major concern. In order to avoid data loss, service-providers generally need to maintain multiple copies of each file so as to minimise the risk that information is irrecoverably lost as a result of any isolated drive failure or failures.

An issue of great importance to cloud-storage service-providers is "How many copies is enough?", as the risk of total loss drops asymptotically to zero with an increase in the number of replicas stored (i.e. for any finite number of copies, there is a chance of irrecoverable loss, but as long as any failed storage device is replaced with another that is then populated with the same content within an amount of time during which the failure of any individual storage device is a statistically rare event, the chance of total loss of any document quickly becomes vanishingly small as the number of copies increases).

For example, the Google File System (GFS) reportedly maintains three copies of every file, which of course means that the total storage capacity needs to be at least three times the size of the actual amount of unique data. This, combined with the "80/20 rule" that characterises file popularity (i.e. approximately 80% of all input/output (I/O) events is accounted for by the most popular 20% of files), means that the vast majority of content is rarely (if ever) accessed, and that a very large fraction of the total storage capacity is wasted on back-up copies of files that are never (or almost never) used.

This very safe but costly approach to "storage-as-a-service" becomes increasingly unsustainable as volume grows exponentially and users start relying more and more on Cloud Storage to store, access and back up content. As a result, finding more efficient ways of maintaining the substantial infrastructure is becoming increasingly important.

Referring to prior art disclosures and techniques, a paper by Lingwei Zhang and Yuhui Deng entitled "Designing a Power-aware Replication Strategy for Storage Clusters" (Proceedings of the 2013 IEEE International Conference on Green Computing, pages 224-231) provides an introduction to the field of Cloud Storage and the associated reliability and availability issues. It focuses on the matter of how to segregate popular and unpopular files between drives so as to be able to power down part of the storage facility without compromising response time.

In a paper by Ouri Wolfson, Sushi Jajodia and Yixiu Huang entitled "An Adaptive Data Replication Algorithm" (ACM Transactions on Database Systems (TODS), Volume 22, Issue 2, June 1997, pages. 255-314), the authors propose the use of dynamic read-write patterns as input to a decision function that determines when and where to replicate an object in a distributed database (which can be regarded as a fore-runner to Cloud Storage) so as to maximise overall performance. In order to achieve faster performance, a dynamic (rather than static) replication strategy is proposed.

A paper by Edith Cohen and Scott Shenker entitled "Replication Strategies in Unstructured Peer-to-Peer Networks" (Proceedings of SIGCOMM '02, Aug. 19-23, 2002, Pittsburgh, Pa., US) presents purported advantages of a replication strategy that sits between making the number of copies of a file uniform and making it proportional to file popularity.

A paper by David Bindel et al entitled "OceanStore: An Extremely Wide-Area Storage System" (Report No. UCB/CSD-00-1102 of the Computer Science Division (EECS), University of California, Berkeley, Calif. 94720, March 1999) describes "OceanStore" as "a utility infrastructure designed to span the globe and provide continuous access to persistent information". It proposes an infrastructure comprised of untrusted servers in which data is protected through redundancy and cryptographic techniques. Data may be cached anywhere, at any time, and monitoring of usage patterns is said to allow for adaptation to regional outages and denial of service attacks, and to enhance performance through pro-active movement of data.

A paper by Sanjay Ghemawat, Howard Gobioff and Shun-Tak Leung entitled "The Google File System" (Proceedings of the 19th ACM Symposium on Operating Systems Principles (2003), pages 29-43) discusses the Google File System (GFS) and the "three copies" concept referred to above.

SUMMARY OF THE INVENTION

According to a first aspect of the present invention, there is provided a method for storing electronic documents in a distributed electronic storage system comprising a plurality of electronic storage devices together providing a total storage capacity, the system having a target number of copies in respect of each document stored therein;
the method comprising:
in response to a request to the system for a copy of a document, determining the current number of copies of that document stored in the system and increasing the number of copies of that document stored in the system unless the number of copies of that document stored in the system is already at or above the target number of copies in respect of that document;

in response to a determination that the current number of copies of a document stored in the system is at or above the target number of copies in respect of that document, and a determination that the current total storage capacity of the electronic storage devices in the system permits storage of at least one further copy of at least one other document, selecting at least one other document the number of copies stored in the system of which is below the target number of copies in respect of that at least one other document, and increasing the number of copies of that at least one other document stored in the system.

According to preferred embodiments, the target number of copies in respect of each of a plurality of documents stored in the system, or possibly all documents stored in the system, may be the same (e.g. 2, 3 or 4 copies of each document, for example). Alternatively, the target number of copies in respect of different documents, or different categories of document, for example, may be different. Target numbers may be predetermined, set according to customer preferences or service levels, set according to characteristics of documents, or otherwise, for example.

The target number of copies in respect of one or more documents stored in the system may be variable, possibly varying automatically in response to characteristics monitored during operation of the system, or possibly in response to human input, for example.

According to preferred embodiments, the system may have a threshold number of copies in respect of one or more of the documents stored therein, the threshold number of copies in respect of a document being lower than the target number of copies in respect of that document. The threshold number may be one, for example, allowing specific action to be taken if it is determined that only a single copy of a particular document remains in the system. With such embodiments, the method may further comprise increasing the number of copies of a document in respect of which the system has a threshold number of copies in response to a determination that the current number of copies of such a document stored in the system is at or below the threshold number of copies in respect of that document. Alternatively, the method may comprise prioritising an increase in the number of copies of one or more documents in respect of which the system has a threshold number of copies in response to a determination that the current number of copies of such a document stored in the system is at or below the threshold number of copies in respect of that document, over an increase in the number of copies of one or more documents the current number of copies stored in the system of which is above the threshold number of copies in respect thereof. In either case, the step of selecting at least one "other" document may be modified accordingly, in order to cause or prioritise (i.e. increase the likelihood of or otherwise favour) an increase in the number of copies of the chosen "other" document(s).

According to preferred embodiments, the step of selecting at least one other document may be performed in response to a determination, made in response to a request to the system for a copy of a document, that the current number of copies of the requested document stored in the system is at or above the target number of copies in respect of that document. Alternatively, an attempt to replicate a document may be triggered by receipt of a request to the system for a copy of that document. With such embodiments, particularly those in which specific access attempts trigger replication, preferentially of the requested document but otherwise of a selected "other" document, "popularity" or "relative popularity" of documents may implicitly be taken into account without any need for dedicated records to be kept of the "popularity" or "relative popularity" of documents. Alternatively, however, "popularity" or "relative popularity" of documents may be explicitly tracked in order to obtain the same or a similar effect.

According to preferred embodiments, the step of selecting the at least one other document may be performed in dependence on one or more of:

the number of copies of respective other documents stored in the system;

the period of time since respective other documents were last requested;

measures of frequency with which respective other documents have been requested during a period of time;

measures of importance of respective other documents stored in the system;

measures of cost associated with loss of all instances of respective other documents from the system;

measures of performance (such as speed of input/output access, for example) of electronic storage devices storing copies of respective other documents.

One or more options from the above may be chosen in respect of different systems or scenarios, in order to provide different desired behaviours.

According to preferred embodiments, the step of selecting the at east one other document may comprise one or more of:

selecting said at least one other document at random from a plurality of documents the number of copies stored in the system of which is below the target number of copies in respect of each of those documents;

selecting a document the number of copies stored in the system of which has recently decreased to a number below the target number of copies in respect of that document;

selecting a document the number of copies stored in the system of which has recently decreased to a threshold number of copies in respect of that document. Again, one or more options from the above may be chosen in respect of different systems or scenarios, in order to provide different desired behaviours.

According to preferred embodiments, the determination as to whether the current total storage capacity of the electronic storage devices in the system permits storage of at least one further copy of at least one other document may be made by determining whether at least one of the electronic storage devices in the system has sufficient capacity to permit storage of at least one further copy of at least one other document therein. This may be done by requesting updates from individual storage devices, by maintaining records of the amount of storage space used in respective storage devices, or otherwise.

According to preferred embodiments, the method may further comprise a step of initiating a storage device investigation, maintenance or replacement procedure in response to an indication that a storage device may have malfunctioned and/or that communication therewith has failed. Such an indication may be in the form of a specific message indicating failure of a storage device, or may be inferred from a lack of response to a request for a document or for a status update, for example. Initiating a storage device investigation, maintenance or replacement procedure may simply involve raising an alarm, or may involve performing further automated steps, for example.

According to preferred embodiments, the method may further comprise a step of updating records of the numbers and/or locations of copies of one or more documents stored in the system in response to a determination that a storage device previously holding copies of those documents has malfunctioned and/or that communication therewith has failed. Such determinations may be made during ongoing operation of the method, while attempting to serve requests for documents, or may be made as part of a dedicated "housekeeping" procedure, involving polling individual storage devices, for example.

According to a second aspect of the present invention, there is provided apparatus for storing electronic documents in a distributed electronic storage system comprising a plurality of electronic storage devices together providing a total storage capacity, the system having a target number of copies in respect of each document stored therein;

the apparatus comprising a management device or suite of management devices arranged to perform a method according to any of the preceding claims.

The apparatus may comprise a dedicated storage manager device arranged to be in communication, via the Internet or otherwise, with the electronic storage devices of the electronic storage system and/or with a number of users who may send requests for copies of documents thereto. It may have one or more interfaces for receiving requests from users for copies of documents, for submitting requests for information and/or copies of documents to the electronic storage devices and for receiving responses therefrom, and/or for providing information and/or copies of documents to users (although generally, copies of documents are likely to be provided to users without needing to pass via the storage manager), and a processor operable to perform the determination, selecting and any other processing steps involved, and to determine appropriate instructions to be sent to and implemented by the storage devices in relation to any replication and storage of copies of documents.

Alternatively, the apparatus may comprise one or more management modules which may be located at or in association with respective storage devices, for example, and which may operate collaboratively in order to exchange information concerning the storage devices.

The various options and preferred embodiments referred to above in relation to the first aspect are also applicable in relation to the second aspect.

Preferred embodiments can be used to implement a runtime method for maintaining file copies in a cloud storage system in such a way that high levels of availability and reliability can be achieved with lower redundancy than usual, and/or to provide a better balance between availability/reliability and overall storage capacity used or required. By using such methods, a similar quality of service can be obtained for lower capital investment and operational expenses, or a better quality of service can be obtained for the same capital investment and operational expenses when compared with existing systems, since lower redundancy (i.e. fewer copies) implies lower storage capacity.

BRIEF DESCRIPTION OF THE DRAWINGS

Preferred embodiments of the present invention will now be described with reference to the appended drawings, in which:

FIG. 2 is a flowchart indicating a file access and replication procedure that may be performed by or under the control of a storage manager according to a preferred embodiment.

DESCRIPTION OF PREFERRED EMBODIMENTS OF THE INVENTION

Figure 1:
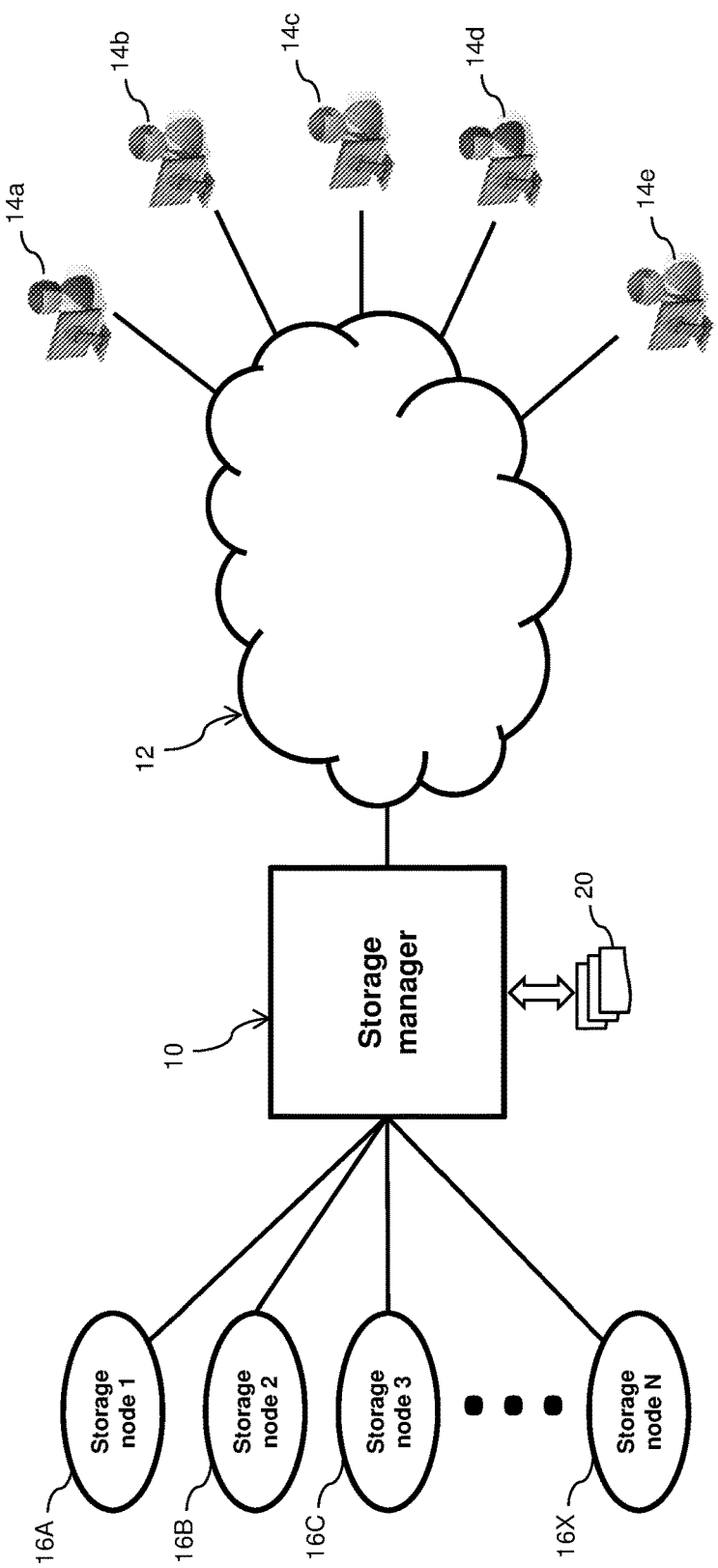
FIG. 1 is a schematic representation of a scenario in which a number of users are able to obtain documents stored using a cloud storage system.

With reference to the accompanying figures, methods and associated apparatus for storing electronic documents according to preferred embodiments will be described.

The concept on which embodiments of the invention are based stems from a realisation that, in an ideal scenario, files that have been uploaded to the Cloud but are (almost) never accessed should progressively "fade away" from the storage infrastructure (or at least the number of replicas thereof should generally be permitted to decrease, perhaps to a minimum other than zero), making space for additional back-up copies of popular files the loss of which would be highly damaging to the provider's reputation.

As previously mentioned, a remarkable but ubiquitous characteristic of information systems is the "80/20 rule" whereby 20% of files are responsible for approximately 80% of all access events. The exact number may vary depending on content type (e.g. it could be "90/10" or "70/30"), but an important issue to note is that not all files are equal in "importance" or "popularity" and that, when ranked from most to least popular, they tend to follow a power curve (sometimes referred to as "Zipf's Law").

The difficulty is that where each file will eventually sit on that curve usually cannot be predicted with any real certainty. In other words: it is generally impossible (or nearly impossible) to measure the popularity of a file ahead of time and to use this measurement in order to make a useful decision as to how many copies of a document should be created and maintained. Only progressively does it become apparent which content is being accessed more frequently.

A rational option is therefore to start with the same number of copies for each file, but to note that it is not necessary to maintain that number constant for each file as each file's popularity progressively emerges. Preferred embodiments follow from a realisation that it is actually possible to capitalise on the failure of storage devices, using their replacement with an empty unit as an opportunity to alter the distribution of the number of copies progressively in favour of the most popular content.

Typically, with known systems, after a storage device has failed, the replacement unit is refilled with the same content. This is a very safe approach because, as long as the maintenance cycle is short enough, it is very unlikely that a second copy of the same file will fall victim to another failure before the first has been restored.

As will become apparent, with preferred embodiments, instead of filling a replacement unit with content based on that of its failed predecessor, the replacement unit is progressively filled with copies of files that are actually being accessed.

It will be understood that on its own, this simple rule would simply lead to the proliferation of popular content and the eventual extinction of all other files, even those of intermediate popularity. In order to avoid this, the number of copies may be kept under a certain limit. This limit may be the same for all files, or may be different for different files—for simplicity, this initial explanation will relate to the situation where the limit is the same for all files. When this limit is reached for a specific file, accessing it triggers the replication of another file (i.e. rather than the replication of the recently-accessed file).

The choice of the beneficiary for this "altruistic replication" (in the sense that it can be seen as a popular file "donating" a replication opportunity to a less popular one) may be done via a random selection, possibly biased in favour of files that have the fewer copies, in favour of files that have recently "lost" a replica, or in other ways.

Before describing a preferred embodiment in detail, a simulated implementation will be discussed which has allowed comparisons to be made in terms of availability (i.e. the fraction of successful accesses) between the relative performances of (i) a file system that maintains an average of two copies per file and a maximum of three; (ii) a file system that maintains an average of three copies per file and a maximum of four; and (III) a file system such as the Google File System in which an aim is that all files have three copies. Note that in scenario (i) the (simulated) storage facility would be 33% smaller than in the known "three copies each" scenario, whereas in scenario (ii) the (simulated) storage facility would be the same size as in the "three copies each" scenario.

Due to constraints on time and computational resources available for the simulated implementation, this dealt with a relatively small number of files (2048) of identical size, distributed between 128 storage units (each one with the capacity to hold 32 file replicas). To compensate for this higher "granularity", a relatively high failure rate was hypothesized (drives failing on average after only 100 days of operation) together with a long maintenance cycle (7 days)—this was in order to gather meaningful results. However, the conclusions drawn are applicable to systems that are several orders of magnitude larger and use more reliable storage equipment (although quantitative performance estimates would of course need to be revised accordingly).

File availability was chosen as an efficiency benchmark. In short, a count was made of how many attempts to access a given file were successful (because there was at least one copy left in the system) and how many weren't (because the last copy of a file had disappeared as a result of the failure of the storage device that held it). Average availability was then obtained by dividing the total number of successful attempts by the total number of accesses (successful and unsuccessful).

As for the file replication strategy, every access was used as an opportunity to create a new copy of a file as per the "altruistic" procedure described above provided that there was some free storage space available (i.e. not all operational drives full). Note that as per the chosen parameter values, a seven-day delay (the maintenance cycle) was incorporated into the process for a failed unit to be replaced and be available for use.

To simulate the conventional storage service used for performance comparison, at the end of the maintenance cycle (also seven days), an exact or near-exact replica of the failed unit was instantly created, populated with the same files as before other than those that had been "lost" in the meantime, if any (i.e. if the failed unit contained the last copy of a file, or if the last copy of that file had disappeared before the end of the maintenance cycle as a result of another failure, this particular file can no longer be replicated).

Over 100 independent realisations, each covering one year (365 days) of operation with 1024 access attempts per day to files chosen according to the Zipf's Law distribution of popularity, the results were as follows:

Conventional file system, 3 copies of each file, availability=0.98

Smart Storage "altruistic" system:
2 copies on average (⅔rd storage capacity), 3 copies limit, availability=0.96
3 copies on average, (same storage capacity), 4 copies limit, availability=0.99

In other words, for a much lower storage capacity (⅔rd of that of the conventional file system), the proposed system achieves an availability score within two percent of the conventional system. Further, if used to manage a facility of identical size (i.e. the same total storage capacity), it outperforms it by more than one percent in terms of availability. The reason for this latter result is that, because all files are treated equally in the conventional system, it is not impossible for a very popular file to go missing, which bears a huge penalty. By contrast, with the proposed dynamic/altruistic replication strategy, and because it is probable that a popular file will have been accessed at least once during the course of the maintenance cycle, it will likely have been copied on another drive before the replacement unit has arrived, improving its chances of survival.

Preferred Embodiment

An embodiment will now be described with reference to FIGS. 1 and 2. FIG. 1 is a schematic representation of a scenario in which a number of users (which may include individual end-users using computers in their own individual premises, employees using a corporate network, business users, or other types of user) are able to obtain documents stored using a cloud storage system. In this scenario, a single entity (storage manager 10) centralises all operations relating to file access and replication. In this scenario, a number of users 14*a*, 14*b*, 14*c*, 14*d*, 14*e* (generally, "users 14") are connected via a network 12 (which may be the Internet, for example) to storage manager 10 via which the users 14 may request and access documents stored in any of 'N' storage nodes 16A, 16B, 16C, 16X (generally, "storage nodes 16"). It will be understood that storage manager 10 may be in direct or local communication with the storage nodes 16, or may be in communication with them via the network 12, via a different network, or via a different communication channel, for example.

In order to simplify the description of this embodiment, FIG. 1 illustrates a scenario in which all file access events are routed through a single control entity (storage manager 10), which also makes all replication decisions and takes the necessary action to maintain the cloud storage facility by orchestrating the operations of the storage nodes (access and replication). It will be apparent however that there may be a number of control entities collaborating or performing different roles, and that the control functions may in fact be performed by or at one or more of the storage nodes (again with different entities collaborating or performing different roles), for example. It should be understood that logic corresponding to that of the present embodiment could be applied to a fully distributed system (such as a Peer-to-Peer file sharing application) in which each individual storage node contributes to the management of the whole through propagating queries and file replicas.

Upon receiving a read request for an electronic document such as a file, an item of media content or another executable or non-executable data item from a user (e.g. user 14*a*) via the network 12, the storage manager 10 retrieves the corresponding file record 20 for the requested document, which contains the relevant information about the current number of copies or replicas, and their respective locations. For the sake of clarity and simplicity again, in this embodiment, such records 20 are kept locally by the storage manager 10, but it will be understood that this need not be the case, as the storage of file records 20 could be implemented differently (e.g. using a distributed hash-table).

Using the list contained in the file record 20, the storage manager 10 then initiates contact with all the storage nodes 16 that are known or believed to host a copy of the file in question. In order to be able to respond to the request, it would only have needed to contact one storage node, but "probing" all of them at this stage is one possible way of keeping records up-to-date by detecting which nodes fail to respond (which may be taken as indication that they have crashed or have otherwise gone "offline"), for example. Having completed this "housekeeping" step, the storage manager 10 then retrieves one copy of the file from a (possibly) randomly chosen storage node (e.g. storage node 16A) from the updated list and sends it to the requesting user.

Having determined the number of surviving copies of the requested file in the whole storage system, the storage manager 10 is able to decide whether to create a copy of this file (i.e. if the current number of copies is lower than the target for the file) or "donate" a replication opportunity to another file.

In the embodiment described here, the beneficiary of a "donation" is chosen at random, the only constraint being that the number of copies of the beneficiary must be below its target number of copies. In other embodiments, the choice of beneficiary may be made in such a way as to bias the selection process in favour of files that possess a certain attribute such as, for example, having an unusually low number of replicas, have recently "lost" a replica, or in other ways, as set out earlier.

Once such a file has been identified, a storage node 16 is chosen that (a) doesn't already hold a copy of that file, (b) is currently online and in working order, and (c) has enough empty space to store a new replica. The selected file is then copied to the selected storage node and the file record 20 for that file is updated to reflect the changes (i.e. the number of copies is incremented and the host of the new replica is added to the list of locations for that file).

FIG. 2 shows a flowchart indicating a process that may be performed by, for example, storage manager 10 of FIG. 1, in order to achieve the overall file access and replication procedure set out above.

The process is triggered by receipt (at step s200) by the storage manager from a user of a request for a document. At step s202, the storage manager retrieves the file record 20 for the document in question, which indicates the current number 'n' of replicas of that document that are known (or at least believed) to exist in the overall storage system, and their hosts or locations (i.e. which of the storage nodes 16 are known/believed to be storing a replica of the document in question). A "polling" or "housekeeping" sub-routine involving steps s204 to s216 is then performed (NB this need not happen on every access attempt, as noted below) in order to ascertain whether any of the 'n' storage nodes believed to be storing a replica has in fact failed. Starting with the first of these (step s204), the storage manager contacts it (s208). If a reply is received (s210), the sub-routine is repeated with the next of the storage nodes (s212). If no reply is received, the value of 'n' for that document is reduced by 1 (s214) in order to indicate that one of the replicas of that document previously believed to exist has been lost due to apparent failure of the storage node at which it had been stored, and the file record is updated accordingly (s216). Once the sub-routine has been performed in respect of each of the 'n' storage nodes (s206), the process proceeds to step s218.

(NB As noted above, the "polling" or "housekeeping" sub-routine explained above need not be called by the storage manager in response to every access attempt by a user, as this may add an unacceptable overhead to the overall process. It may instead be called after every n" access attempt, or after a certain length of time 't' has passed since the last time it was performed, for example. While this may run the risk of allowing the storage manager's knowledge of the storage system to be temporarily inaccurate, this would be balanced by the overall increase in speed and efficiency of the process.)

At step s218, one of the storage nodes that has been found still to have a replica of the requested document is selected at random, a copy of the document is requested therefrom (s220), and the copy is sent to the requesting user (s222).

The process then proceeds to a sub-routine in which either the requested document or another document is chosen to be replicated.

Firstly, at step s224, the storage manager determines whether the value of 'n' for the requested document (which, it will be remembered, indicates the number of identified and accountable copies of the document) is below its target or at (or above) its target. If it is below its target, it is determined that the requested document itself needs to be replicated, and the process proceeds straight to step s230 (discussed below). If it is at (or above) its target, it is determined that another document should be replicated instead, and the process proceeds to step s226 at which a document is chosen at random from all those known/believed by the storage manager to be stored at least once in the overall storage system. The file record 20r for that document is then retrieved (step s228) and it is determined at step s224 whether the value of 'n' for the randomly-chosen document is below its target or at (or above) its target. The loop involving steps s224, s226 and s228 repeats until a document is found for which the value of 'n' is below its target, at which point the process proceeds to step s230 with the randomly-selected document having a value of 'n' below the target being the document selected for replication.

(NB It will be noted that the loop involving steps s224, s226 and s228 is only one of a variety of possible ways of identifying a document that currently has fewer than its target copies. If for example it is known or likely that the number of such files is relatively small, and/or if it believed that performing a search according to such a loop may represent an unacceptable overhead, alternative techniques may of course be used. One possible alternative is for the storage manager or another entity to maintain a list of documents that are known or believed to have fewer than the target number of copies, by keeping a record of storage nodes that are known or believed to have failed or become unavailable, or otherwise. Such a technique may also be used in order to identify files the number of replicas of which has dropped to one or to another suitably-chosen "threshold" number between one and the target number, and select or prioritise such files for replication over those having more replicas, or whose number has not dropped to the respective threshold.)

The sub-routine involving steps s230 to s238 identifies a storage node at which to store a copy of the document selected for replication (i.e. this being either the recently-requested document itself or the selected randomly-chosen alternative document).

At step s230, a storage node from all of those controlled by the storage manager is chosen at random. It is then determined (s232) from the file record (20 or 20r) whether or not that storage node is already known/believed to have a copy of the document to be replicated. If so, the process returns to step s230, and another storage node is chosen at random. If not, that storage node is contacted (s234). If no reply is received (s236), indicating that the chosen storage node has failed (or has otherwise become unavailable), the process returns to step s230, and another storage node is chosen at random. If a reply is received (s236), a check is made (s238) as to whether the chosen storage node has sufficient spare capacity to store a copy of the document selected for replication, and if so, that node is selected and the process continues to step s240. If the chosen storage node doesn't have sufficient spare capacity, the process returns to step s230, and another storage node is chosen at random.

(NB Similarly to the above, it will be noted that the sub-routine involving steps s230 to s238 is only one of many possible ways to determine which storage node should be chosen to store an additional or replacement copy of the selected document. Alternatives exist that could for example reduce the processing overhead involved in the above. Instead of selecting one storage node at random from the entire pool at step s230, the storage manager could instead maintain a list of storage nodes known or believed to have spare capacity, for example, and perform steps s232 to s236 (i.e. optionally s238 for confirmation reasons) in respect of them.)

At step s240, one of the storage nodes already know to have a copy of the document selected for replication is chosen at random, and a copy of the document is requested from that storage node (s242). The copy is then sent to the storage node selected to store the new replica (s244). The value of 'n' for that document is then increased by 1 (s246) and the file record for the document is updated accordingly (s248). The process then ends (s250).

Various additional steps may be included in order to take into account all possible circumstances and to assist the storage manager in keeping its knowledge of the whole system up-to-date. For instance, the failure of a storage node to reply at step s210 or step s236 could trigger an investigation into the cause of the malfunction and/or replacement of the storage node in question if found to have failed. It may also be possible that no document with fewer copies than the target number can be found (in the loop involving steps s224, s226 and s228), so it may be appropriate for another exit condition (e.g. no more than a given number of attempts are permitted) to be included in the process. Similarly, it may be possible that the whole storage array is found to be full (i.e. no storage node has sufficient spare capacity to store an additional copy of the document selected for replication) such that no more copies can be created and stored until capacity has been increased by the addition of a new storage node, or until space has been created by deletion, compression or re-organisation. A procedure could therefore be set in place to deal with such an eventuality, by cancelling the replication attempt, by deleting other file copies to make space, or by triggering expansion of the system's capacity through the addition of new storage nodes. Methods to handle such additional operations could be included if desired.

The invention claimed is:

1. A method for storing electronic documents in a distributed electronic storage system comprising a plurality of electronic storage devices together providing a total storage capacity, the system having a target number of copies in respect of each document stored therein, and being configured to receive and respond to requests from users via a network; the method comprising:

in response to a request to the system for a copy of a document, determining the current number of copies of that document stored in the system and increasing the number of copies of that document stored in the system by replicating that document and storing the replica thereof in the system unless the number of copies of that document stored in the system is already at or above the target number of copies in respect of that document; and in response to the request to the system for the copy of the document and the determination of the current number of copies of that document stored in the system, and in response to a determination that the current number of copies of the requested document stored in the system is at or above the target number of copies in respect of that document, and a determination that the current total storage capacity of the electronic storage devices in the system permits storage of at least one further copy of at least one other document, selecting at least one other document the number of copies stored in the system of which is below the target number of copies in respect of that at least one other document, and increasing the number of copies of that at least one other document stored in the system by replicating that at least one other document and storing the replica thereof in the system.

2. A method according to claim 1 wherein the target number of copies in respect of each of a plurality of documents stored in the system is the same.

3. A method according to claim 1 wherein the target number of copies in respect of one or more documents stored in the system is variable.

4. A method according to claim 1 wherein the system stores one or more values indicative of a threshold number of copies in respect of one or more of the documents stored therein, the threshold number of copies in respect of a document being lower than the target number of copies in respect of that document.

5. A method according to claim 4, the method comprising performing the increasing step in such a way as to increase the number of copies of a document in respect of which the system has a stored value indicative of a threshold number of copies in response to a determination that the current number of copies of such a document stored in the system is at or below the threshold number of copies in respect of that document, the increase being achieved by replicating the selected document and storing the replica thereof in the system.

6. A method according to claim 4, the method comprising performing the increasing step in such a way as to prioritise an increase in the number of copies of one or more documents in respect of which the system has a stored value indicative of a threshold number of copies in response to a determination that the current number of copies of such a document stored in the system is at or below the threshold number of copies in respect of that document, over an increase in the number of copies of one or more documents the current number of copies stored in the system of which is above the threshold number of copies in respect thereof.

7. A method according to claim 1 wherein selecting said at least one other document is performed in dependence on one or more of:

the number of copies of respective other documents stored in the system;

the period of time since respective other documents were last requested;

measures of frequency with which respective other documents have been requested during a period of time;

measures of importance of respective other documents stored in the system;

measures of cost associated with loss of all instances of respective other documents from the system;

measures of performance of electronic storage devices storing copies of respective other documents.

8. A method according to claim 1 wherein selecting said at least one other document comprises one or more of:

selecting said at least one other document at random from a plurality of documents the number of copies stored in the system of which is below the target number of copies in respect of each of those documents;

selecting a document the number of copies stored in the system of which has recently decreased to a number below the target number of copies in respect of that document;

selecting a document the number of copies stored in the system of which has recently decreased to a threshold number of copies in respect of that document.

9. A method according to claim 1 wherein the determination as to whether the current total storage capacity of the electronic storage devices in the system permits storage of at least one further copy of at least one other document is made by determining whether at least one of the electronic storage devices in the system has sufficient capacity to permit storage of at least one further copy of at least one other document therein.

10. A method according to claim 1, the method further comprising a step of updating records of the numbers of copies of one or more documents stored in the system in response to a determination that a storage device previously holding copies of those documents has malfunctioned and/or that communication therewith has failed.

11. Apparatus for storing electronic documents in a distributed electronic storage system comprising a plurality of electronic storage devices together providing a total storage capacity, the system having a target number of copies in respect of each document stored therein; the apparatus comprising a management device or suite of management devices arranged to receive and respond to requests from users via a network;

in response to a request to the system for a copy of a document, determine the current number of copies of that document stored in the system and increase the number of copies of that document stored in the system by replicating that document and store the replica thereof in the system unless the number of copies of that document stored in the system is already at or above the target number of copies in respect of that document; and in response to the request to the system for the copy of the document and the determination of the current number of copies of that document stored in the system, and in response to a determination that the current number of copies of the requested document stored in the system is at or above the target number of copies in respect of that document, and a determination that the current total storage capacity of the electronic storage devices in the system permits storage of at least one further copy of at least one other document, select at least one other document the number of copies stored in the system of which is below the target number of copies in respect of that at least one other document, and increase the number of copies of that at least one other document stored in the system by replicating that at least one other document and storing the replica thereof in the system.

\* \* \* \* \*